US012398069B2

(12) United States Patent
Caillet et al.

(10) Patent No.: US 12,398,069 B2
(45) Date of Patent: Aug. 26, 2025

(54) GLAZING COMPRISING A FUNCTIONAL COATING AND AN ABSORBING ELEMENT

(71) Applicant: SAINT-GOBAIN GLASS FRANCE, Courbevoie (FR)

(72) Inventors: Xavier Caillet, Fontenay sous Bois (FR); Elsa Marie Perrin, Paris (FR); Estelle Martin, Saint-Denis (FR); Maxence Wilmet, Rueil-Malmaison (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 70 days.

(21) Appl. No.: 18/568,111

(22) PCT Filed: Jun. 17, 2022

(86) PCT No.: PCT/FR2022/051180
§ 371 (c)(1),
(2) Date: Dec. 7, 2023

(87) PCT Pub. No.: WO2022/263784
PCT Pub. Date: Dec. 22, 2022

(65) Prior Publication Data
US 2024/0270634 A1 Aug. 15, 2024

(30) Foreign Application Priority Data
Jun. 18, 2021 (FR) ..................... 2106500

(51) Int. Cl.
*B32B 15/04* (2006.01)
*B32B 17/06* (2006.01)
(Continued)

(52) U.S. Cl.
CPC .......... *C03C 17/366* (2013.01); *C03C 17/007* (2013.01); *C03C 2217/485* (2013.01)

(58) Field of Classification Search
CPC .................................................. C03C 17/366
(Continued)

(56) References Cited

U.S. PATENT DOCUMENTS 5,792,559 A * 8/1998 Heithoff ............ B32B 17/10651
501/905
6,159,608 A * 12/2000 Friedman .......... B32B 17/10788
428/441

(Continued)

FOREIGN PATENT DOCUMENTS

WO WO 2006/043026 A1 4/2006
WO WO 2018/178547 A1 10/2018
(Continued)

OTHER PUBLICATIONS

International Search Report as issued in International Patent Application No. PCT/FR2022/051180, dated Sep. 5, 2022.

*Primary Examiner* — Lauren R Colgan
(74) *Attorney, Agent, or Firm* — Pillsbury Winthrop Shaw Pittman LLP

(57) ABSTRACT

A material includes at least transparent substrate and has a functional coating or functional layer to act on solar radiation and/or infrared radiation. The material includes an absorbent element in the form of a layer, which in particular absorbs the solar radiation in the visible part of the spectrum and does so in a specific manner. The material has an absorption profile with at least a spike centered between 480 and 549 nm, and a second spike centered between 630 nm and 779 nm. The addition of a layer-form absorbent element exhibiting these two absorption spikes allows an improvement in thermal performance, particularly the selectivity, without having a great impact on the aesthetics of the glazing, so that in particular the transmission remains neutral.

20 Claims, 6 Drawing Sheets

(51) Int. Cl.
  *C03C 17/00*  (2006.01)
  *C03C 17/36*  (2006.01)

(58) Field of Classification Search
  USPC .................................................. 428/432, 434
  See application file for complete search history.

(56) References Cited

U.S. PATENT DOCUMENTS

| | | | |
|---|---|---|---|
| 11,485,115 B2* | 11/2022 | Compoint | B32B 17/10706 |
| 2003/0054160 A1* | 3/2003 | Fisher | B32B 17/10036 |
| | | | 428/458 |
| 2011/0096555 A1* | 4/2011 | Pires | B32B 17/10036 |
| | | | 428/203 |
| 2015/0306848 A1* | 10/2015 | Anderson | B32B 17/10137 |
| | | | 428/501 |
| 2020/0055285 A1* | 2/2020 | Compoint | B32B 17/10972 |
| 2020/0189959 A1* | 6/2020 | Magdenko-Savourey | ................. |
| | | | C03C 17/007 |
| 2021/0347685 A1* | 11/2021 | Ongarello | B32B 17/10055 |

FOREIGN PATENT DOCUMENTS

| | | |
|---|---|---|
| WO | WO 2018/197821 A1 | 11/2018 |
| WO | WO 2019/015917 A1 | 1/2019 |
| WO | WO 2019/049884 A1 | 3/2019 |
| WO | WO 2019/097192 A1 | 5/2019 |
| WO | WO 2020/079375 A1 | 4/2020 |

* cited by examiner

[Fig. 1]
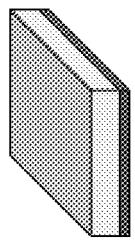
[Fig. 2]
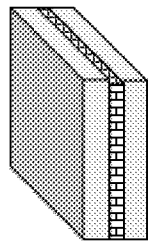
[Fig. 3]
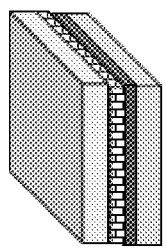
[Fig. 4]
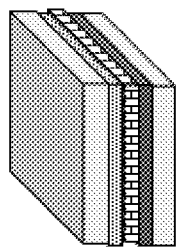

[Fig. 5]
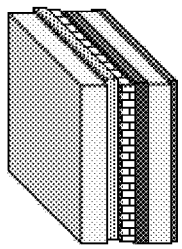
[Fig. 6]
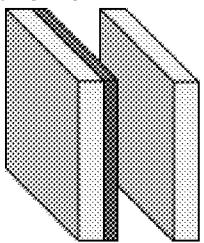
[Fig. 7]
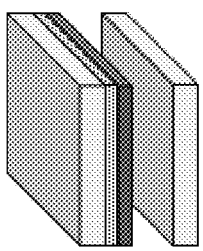
[Fig. 8]
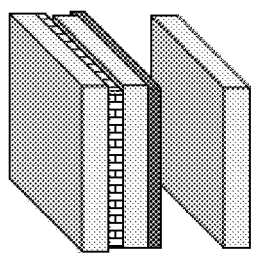
[Fig. 9]
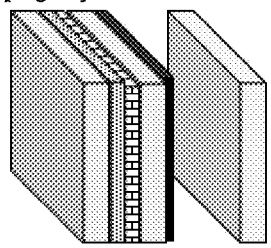

[Fig. 10]
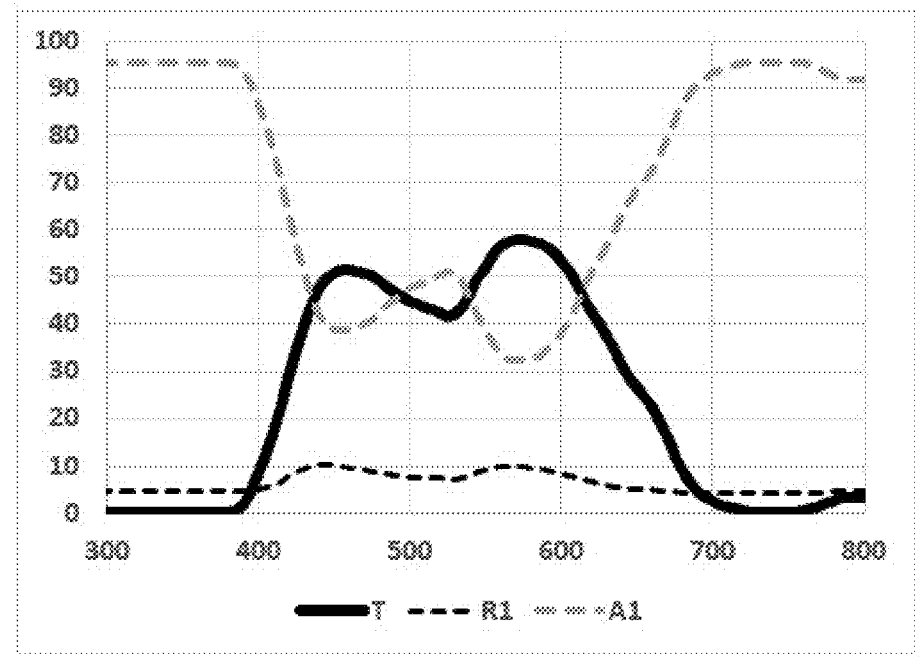
[Fig. 11]
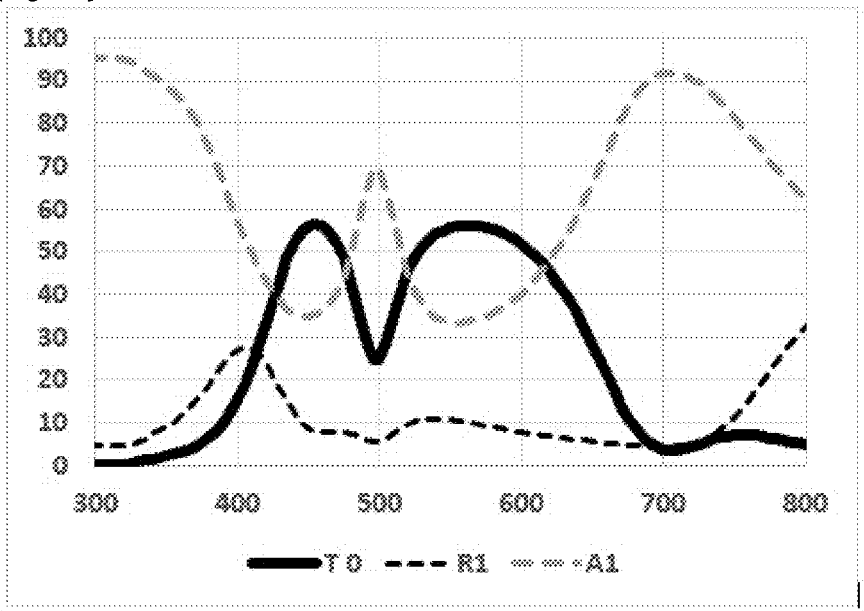

[Fig. 12]
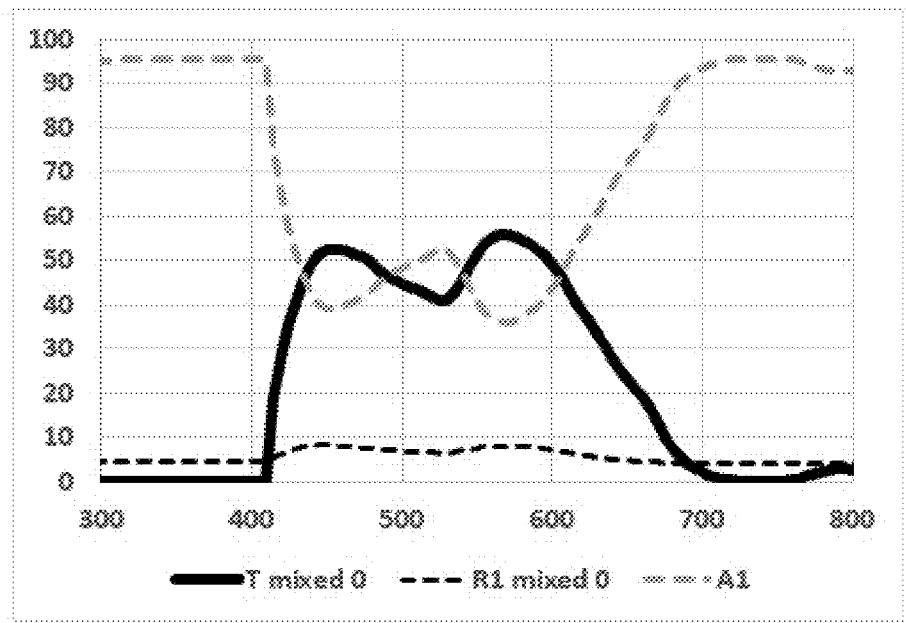
[Fig. 13]
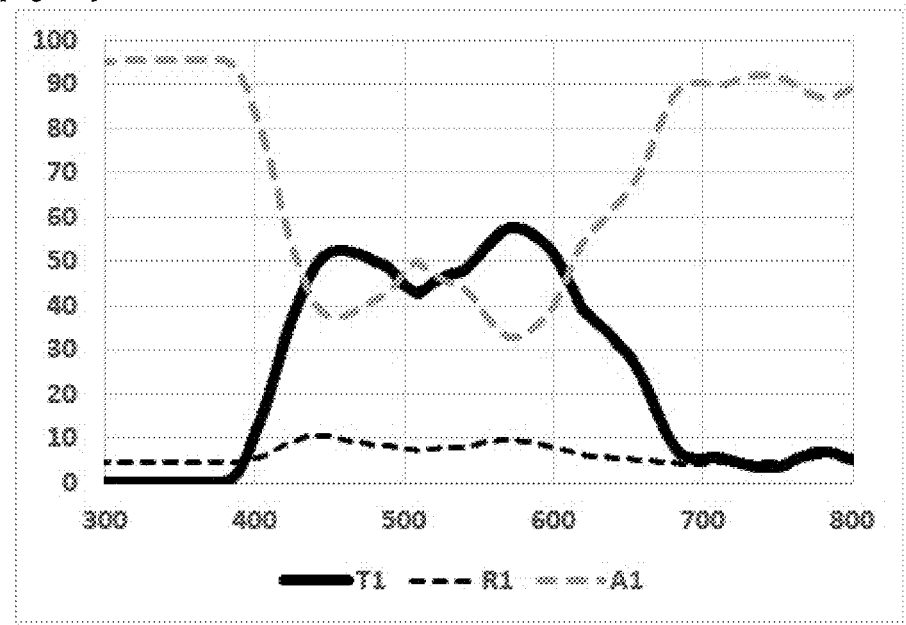

[Fig. 14]
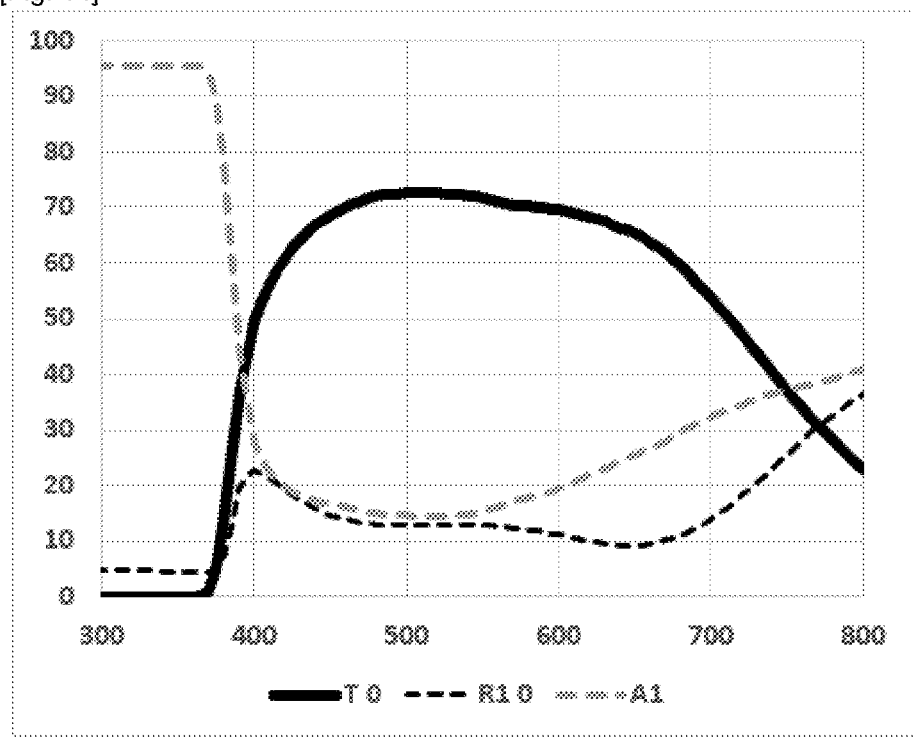
[Fig. 15]
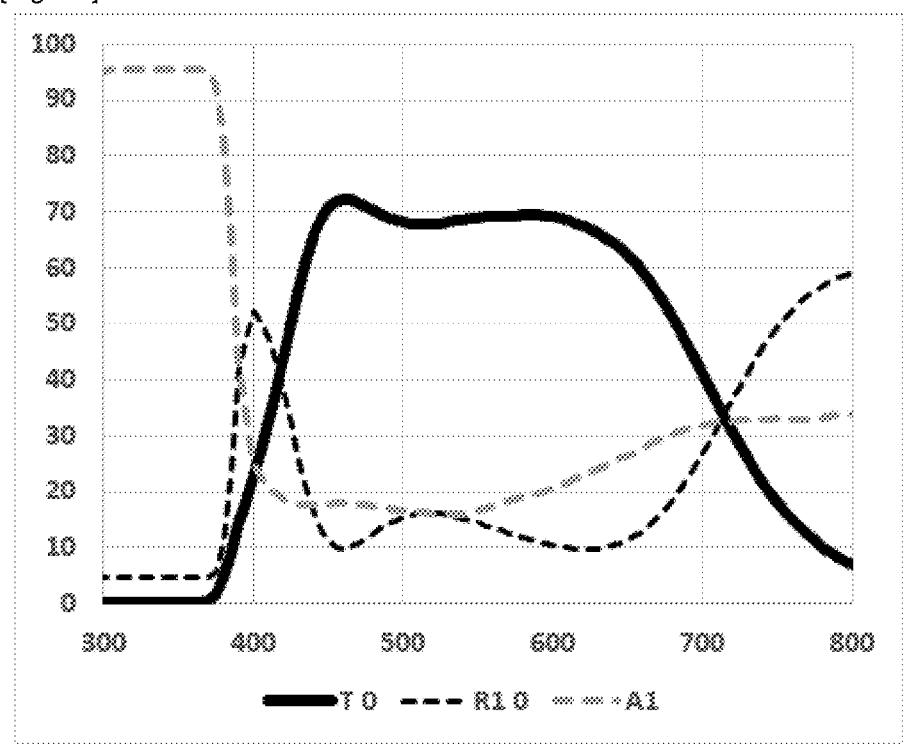

[Fig. 16]
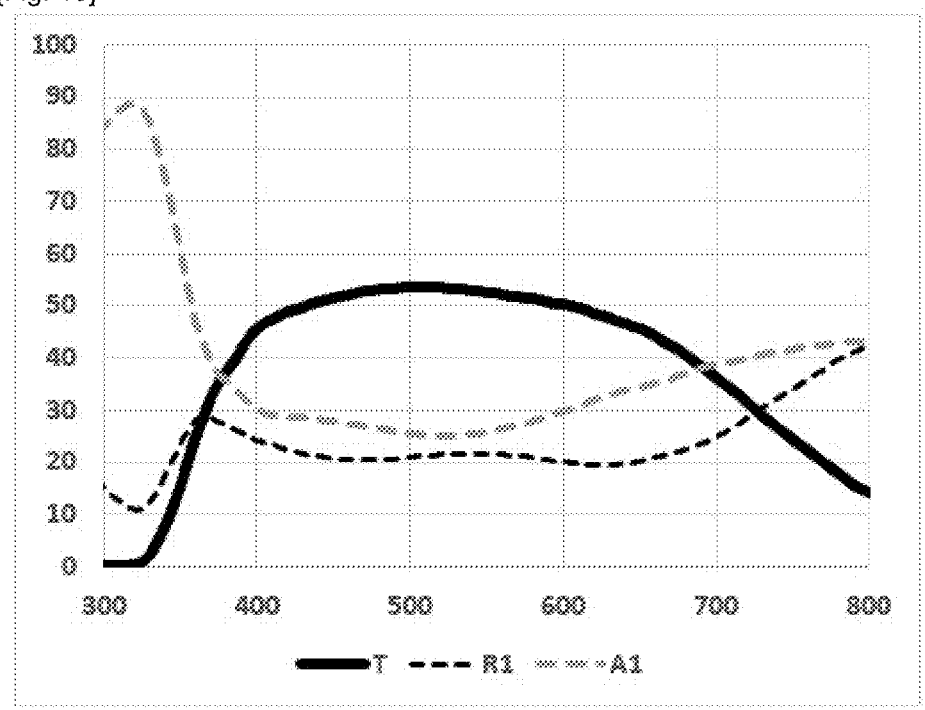
[Fig. 17]
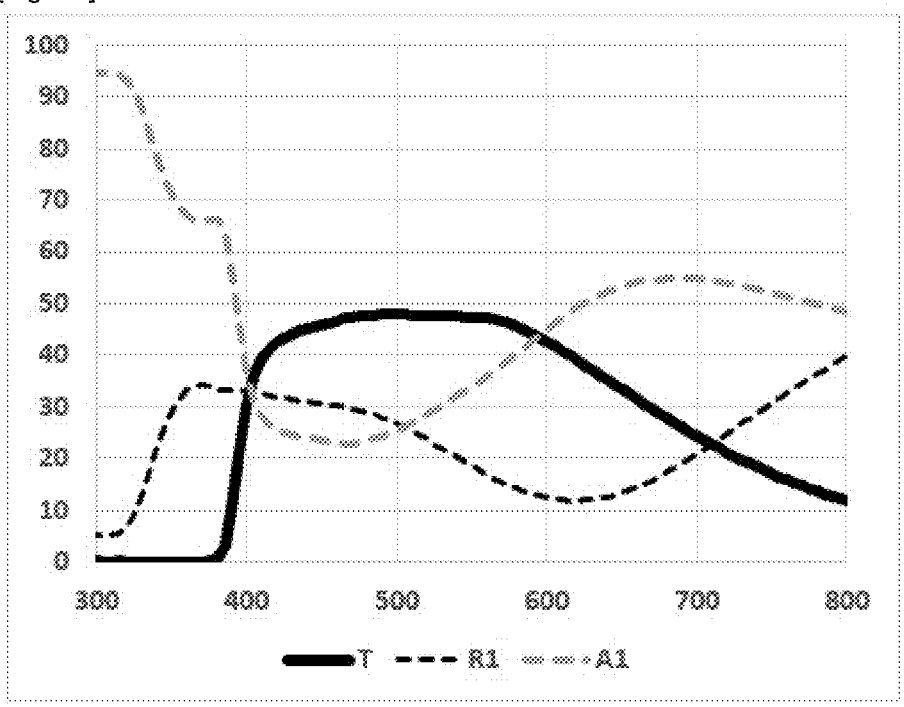

GLAZING COMPRISING A FUNCTIONAL COATING AND AN ABSORBING ELEMENT

CROSS-REFERENCE TO RELATED APPLICATIONS

This application is the U.S. National Stage of PCT/FR2022/051180, filed Jun. 17, 2022, which in turn claims priority to French patent application number 2106500 filed Jun. 18, 2021. The content of these applications are incorporated herein by reference in their entireties.

The invention relates to a material including a transparent substrate comprising a functional coating or a functional layer able to act on solar radiation and/or infrared radiation. The invention also relates to the glazings comprising these materials and also to the use of such materials for manufacturing thermal insulation and/or solar protection glazings.

In the remainder of the description, the terms "functional coating or functional layer" means "able to act on solar radiation and/or infrared radiation", that is, providing the material with an anti-solar and/or low-emissivity property. This property may be provided by a coating consisting of a stack of layers, typically an alternation of n metal functional layers(s) and of n+1 dielectric coatings. This property can also be provided by a lamination layer, typically based on PVB including an absorber in the infrared range. This property may also be provided by one of the transparent substrates made of glass or other material.

These glazings can be intended both to equip buildings and vehicles, in particular to reduce the air conditioning and/or prevent excessive overheating, so-called "solar control" glazings.

Depending on the climates of the countries in which these glazings are installed, particularly depending on the amount of sunshine, the desired performance properties in terms of light transmission and solar factor may vary. Consequently, different ranges of glazings characterized by their level of light transmission are developed.

For example, in countries with high levels of sunshine, there is a great demand for glazings having a light transmission of the order of 40% and sufficiently low solar factor values. In countries where the levels of sunshine are lower, a higher light transmission is sought.

The selectivity "S" enables the performance of these glazings to be evaluated. It corresponds to the ratio of light transmission $TL_{vis}$ in the visible range of the glazing to the solar factor SF of the glazing ($S=TL_{vis}/SF$). Solar factor "SF or g" is understood to mean the ratio in % of the total energy entering the premises through the glazing to the incident solar energy.

Obtaining a high selectivity must not be done to the detriment of the aesthetic appearance and in particular of the color. In general, it is sought to obtain the most neutral appearance possible in transmission and in external reflection, or even in internal reflection, as well as a stability of the color at angles, that is, when the observation is not at the normal of the glazing.

The conventional approach to obtain both high selectivity and excellent color neutrality consists in developing increasingly sophisticated functional coatings.

Known selective glazings comprise transparent substrates coated with a functional coating comprising a stack of several metallic functional layers, each arranged between two dielectric coatings. Such glazings make it possible to improve solar protection while retaining a high light transmission. These functional coatings are generally obtained by a sequence of depositions carried out by cathode sputtering, optionally assisted by a magnetic field.

Conventionally, the faces of a glazing are designated starting from the exterior of the building and by numbering the faces of the substrates from the outside towards the inside of the passenger compartment or of the premises which it equips. This means that the incident sunlight passes through the faces in increasing numerical order.

The known selective glazings are generally double glazings comprising the functional coating located on face 2, that is to say on the outermost substrate of the building, on its face turned toward the interlayer gas gap.

The invention specifically relates to highly selective glazings, for example comprising complex functional coatings based on metallic functional layers, generally silver-based or transparent conductive oxide based.

Silver-based functional coatings are generally more efficient in terms of selectivity relative to the other known infrared-reflecting functional coatings such as coatings comprising layers based on conductive oxide or based on other metallic layers or absorbent layers in the IR.

These silver-based functional coatings are described as complexes due to the number of layers constituting them, because of the nature of the materials constituting these layers and the adjustment of the thickness of these layers. The complexity of the functional coatings makes it difficult to obtain good thermal performance and a particular aesthetic appearance, for example excellent color neutrality and good color stability at angles.

The greater the number of silver-based functional layers, the greater the possibility of increasing the selectivity. In particular, there are functional coatings including 1, 2, 3 or 4 silver-based layers. The selectivities achieved in double glazings by virtue of these coatings are respectively 1.2, 1.8, 2.2 and 2.25. Three-layer silver stacks are for example described in WO 2019/015917.

One way of further improving the selectivity could therefore be to increase the number of reflective layers in the IR. However, the multiplication of the silver layers affects the transmission spectrum of the glazings. These glazings take an increasingly green or yellow hue in transmission.

Document WO 2006/043026 describes a solar control glazing with very low light transmission, in particular laminated including a solar control coating ("low E") on one face and an absorbent layer which absorbs radiation with a wavelength greater than 400 nm, on another face. The absorbent layers described are based on Ti or NiCrN and TiN. It is specified that the absorption in the visible and the IR is substantially constant over the entire spectrum from 400 nm to 100 μm. The light transmissions obtained are 14 and 15%, which limits the applications of these glazings to privacy glazings. The thermal performance is not optimal.

Document WO 2019/097192 describes a coated material incorporated in a glazing referred to as "solar control" and/or "low-E" glazing. The coating includes an absorbent layer based on NiCr or TiN. The glazings obtained have a selectivity of the order of 1.5 in double glazing configuration, which is less than the objective of the present invention.

Document WO 2018/178547 describes glazings whose color is modified by the use of a colored lamination interlayer. These glazings also have an excessively low selectivity compared to the most efficient products.

Document U.S. Pat. No. 5,792,559 also describes glazings whose color is modified by the use of a colored lamination interlayer. It is known from this document that it is possible to incorporate selective dyes into the PVB interlayer that are absorbent in a single specific wavelength to provide a desired color.

Document WO 2020/079375 describes a material comprising a functional coating on one face and an absorbent coating of colorimetric adjustment on another face. This absorbent coating has a relatively constant absorption spectrum in the visible that is flat or without spikes. The "combined" glazing has a good aesthetic but a reduced selectivity compared to the glazing with the functional coating alone.

Document WO 2019/049884 describes optical filters that block near IR and maintain good transmission in the visible. The field of application (imaging device such as digital still cameras) is very different from solar-control glazings.

Colored glazings composed of a clear glass substrate on which a colored coating is deposited for which the colorimetric characteristics are easily adjustable and modifiable are known from document WO 2018/197821. The coating includes metal nanoparticles in an inorganic matrix of an oxide, for example TiOx:Ag. In the various examples described, the colored coatings have respectively a plasmonic absorption peak at 550 nm, 480 nm, 520 nm, and 610 nm (Examples A to D) and 490, 440 and 420 nm (examples E to G). The term "plasmonic" is understood to mean an absorption linked to the effects of plasmonic resonances of silver nanoparticles in a dielectric matrix.

The aim of the invention is to develop an anti-solar glazing, the transmission of which is between 30 and 70%, having improved thermal performance, especially a very high selectivity, while guaranteeing the desired aesthetic appearance, that is to say the most neutral appearance possible, in particular not green or yellow in transmission.

The objective sought by the invention is therefore to obtain a range of glazings having very high selectivity while retaining the aesthetic appearance of the glazing, in particular its light transmission must be as neutral as possible.

The applicant has developed a new solution that makes it possible to achieve these objectives without interfering with the complexity of current functional coatings.

The proposed solution consists in adding into a layer or to one of the elements of the glazing (substrate or lamination interlayer) a particular absorbent element which absorbs solar radiation in the visible part of the spectrum in a specific manner and which makes it possible to improve thermal performance while not negatively impacting the aesthetic requirements.

In particular, the absorbent element is such that the glazing including the material according to the invention has an absorption profile with at least two absorption zones in the visible range, one between 630 and 780 nm and the other between 480 and 550 nm.

The inventors have discovered that the addition of such an absorbent element makes it possible to significantly improve the thermal performance, in particular the selectivity without greatly impacting the aesthetic appearance of the glazing, in particular the transmission remains neutral.

The choice of these two absorption areas is absolutely not the result of an arbitrary selection. The applicant has discovered that absorbing between 630 and 780 nm makes it possible to significantly increase the selectivity. However, absorbing in this zone very negatively impacts the colors in transmission, which become more green.

Indeed, absorbing in this visible zone makes it possible to significantly reduce the total energy entering the space or the vehicle and therefore to lower the solar factor without significantly reducing the light transmission. This phenomenon is explained because the determination of the light transmission takes into consideration the sensitivity of the human eye or visual acuity. The sensitivity of the eye along the wavelength decreases gradually on either side of a maximum between 495 and 555 nanometers (nm). The human eye is therefore less sensitive to the extreme wavelengths of the visible range, in particular at wavelengths in the range of 630 to 780 nm. Light transmission is weakly impacted by an absorption between 630 and 780 nm because it is absorbed in an area where the human eye is less sensitive. Ultimately, the small decrease in light transmission coupled with the high reduction in energy transmission leads to a clear improvement in selectivity.

On the other hand, absorbing in the range between 630 and 780 nm has a strong impact from the point of view of color. When light rays reach the eyes, they are picked up by photoreceptors at the retina. There are three types of photoreceptors that each have spectral sensitivity to a region of the color spectrum: some cones are more sensitive to blue light (peak centered at about 420 nm), others to green light (peak centered at 530 nm) and the third type of cones to red light (peak centered at 565 nm). Absorbing light between 630 and 780 nm, that is to say in the area corresponding to the predominant region of absorption of red light, has the effect of a perception of the complementary colors and in particular green.

Therefore, the applicant wondered how to neutralize this green color. The applicant has discovered that by adding an absorber having an absorption zone between 480 and 550 nm, that is to say in the zone corresponding to the predominant region of absorption of green light, it obtains in transmission a neutralization of green color resulting from absorption between 630 and 780 nm. The addition of absorption in this zone between 480 and 550 nm is detrimental to light transmission TL and selectivity. However, the applicant has discovered that using these two combined absorption zones makes it possible to obtain better selectivity with, as the sole disadvantage, a slight decrease in light transmission.

The solution of the invention having these two privileged absorption zones therefore corresponds to the best compromise resulting in an increase in selectivity and to a neutrality in color in transmission. Finally, this solution based on the use of one or more absorbent elements makes it possible to obtain good stability of the colors at transmission angle.

The absorbent element may be incorporated into a layer deposited on one of the faces of the glazing; or it may be incorporated in the matrix of one of the substrates, or advantageously incorporated in the matrix of at least one laminating interlayer. The absorbent element may comprise several dyes incorporated at different locations of the glazing, for example a mixture of dyes incorporated in the host matrix and a mixture of dye incorporated in the lamination interlayer.

To characterize the absorption profile of the material according to the invention, the solar spectrum was divided into 5 adjacent zones that cover the UV domain and are visible between 300 and 780 nm; a (from 300 to 379 nm), A (from 380 to 479 nm), B (from 480 to 549 nm), C (from 550 to 629 nm) and D (from 630 to 779 nm). The average absorptions in each of the 5 zones are called $A_{ext}(\alpha)$, $A_{ext}(A)$, $A_{ext}(B)$, $A_{ext}(C)$, and $A_{ext}(D)$ and were compared.

For a zone Z defined between two wavelength $\lambda$:$Z=[\lambda_{minZ}, \pi_{maxZ}]$:

$$A\_ext(Z) = \left(\left(\int_{\lambda_{minZ}}^{\lambda_{maxZ}} \_(1 - T(\lambda) - R_{ext}(\lambda))d\lambda\right)/\lambda_{maxZ} - \lambda_{minZ}\right)$$

The invention relates to a material capable of equipping a building or passenger compartment by defining an exterior side and an interior side, comprising at least one transparent substrate, each substrate comprising two main faces, the material including a functional coating or functional layer that can act on solar radiation and/or infrared radiation, characterized in that the material includes at least one absorbent layer element such that the material has, in the visible spectrum range, measured outside, when the spectrum is divided into 4 adjacent zones: A (from 380 to 479 nm), B (from 480 to 549 nm), C (from 550 to 629 nm) and D (from 630 to 779 nm):

- at least a first absorption range in the zone D, and a second absorption range in the zone B;
- the ratio of the average absorption $A_{ext}(B)$ integrated over the range (B) to the average absorption $A_{ext}(C)$ integrated over the range (C) is greater than 0.9 and preferably greater than 1.0, and still more preferably greater than 1.2;
- the ratio of the average absorption $A_{ext}(D)$ integrated over the range (D) to the average absorption $A_{ext}(C)$ is greater than 1.5, and preferably greater than 1.8.

The functional coating is preferably a stack of layers comprising one or more silver-based functional metal layers, each arranged between two dielectric coatings. This type of coating has a transmission profile that peaks more or less in the visible range.

The greater the number of silver layers, the narrower the profile and the narrower the absorption peak. This results in an absorption which becomes insignificant at the extreme values of the visible spectrum, and in particular in an absorption of red towards 700 nm. The choice of an absorbent element having an absorption profile with at least two absorption zones in the visible range, one between 630 and 780 nm and the other between 480 and 550 nm is likely to confer the same profile on the glazing. This type of absorbent element makes it possible to maintain a relatively high light transmission in the visible and to selectively modify the absorption profile.

The solution of the invention remains advantageous regardless of the nature of the functional coating. The functional coating may be a coating based on a transparent conductive oxide (TCO).

The inventors have discovered that, in order to obtain the desired glazing, the material including the absorbent element should preferably have an absorption profile with:

- the ratio $A_{ext}(D)/A_{ext}(B)$ greater than 1.2, preferably greater than 1.5, still more preferably between 1.5 and 3.0;
- the ratio $A_{ext}(B)/A_{ext}(A)$ greater than 1.0 and preferably greater than 1.2;
- the ratio $A_{ext}(D)/A_{ext}(A)$ greater than 1, preferably greater than 1.3 and still more preferably greater than 1.8;
- the ratio $A_{ext}(\alpha)/A_{ext}(A)$ greater than 1.0 and preferably greater than 1.2, and still more preferably greater than 1.4;
- the ratio $A_{ext}(\alpha)/A_{ext}(C)$ greater than 1.5 and preferably greater than 2.0.

The ratio of the average absorption $A_{ext}(A)$ integrated over the range (A) to the average absorption $A_{ext}(C)$ integrated over the range (C) may be greater than 1.2, preferably greater than 1.4.

The term "absorbent layer element" is understood to mean fine layers deposited for example by magnetron sputtering or wet method, as well as elements such as an absorbent substrate or an absorbent lamination interlayer.

In particular, the absorbent layer element includes at least two substances absorbent in the visible, dispersed or dissolved in a matrix which may be of organic, inorganic or hybrid nature. In particular, the substances absorbent in the visible may be soluble dyes or (insoluble) pigments.

When the material according to the invention comprises at least two transparent substrates, the functional coating is preferably arranged on the interior face of the outermost substrate (face 2).

When the material according to the invention comprises at least two transparent substrates and a lamination interlayer, the absorbent layer element may be the lamination interlayer including at least one substance absorbing in the visible.

Advantageously, the material according to the invention includes at least one absorbent substance incorporated in a layer deposited on one of the faces of the at least one substrate.

The layer may in particular be deposited by liquid method.

According to one embodiment of the invention, the functional coating or functional layer is a tinted lamination interlayer.

According to another embodiment, the functional coating or functional layer is a stack of thin layers deposited by magnetron.

In this case, the stack generally comprises one or several metallic functional layers, in particular silver-based, each arranged between two dielectric coatings.

However, the functional coating may be replaced by another element of the glazing providing the solar-protection and/or low-emissivity function. For example, this function may be provided by lamination interlayers, layers of resins deposited by chemical vapor deposition (CVD), or by the substrate: tinted glass or glass made of organic polymeric material.

Generally, the substrate is made of glass, especially soda-lime-silica glass, or of polymeric organic material.

The material according to the invention can have a light transmission of between 30 and 80%, in particular between 45 and 75%.

Advantageously, the material has a colorimetric index a*T between −6 and 1, preferably between −4 and 0 and a b*T colorimetric index comprised between −5 and 5 and preferably between −3 and 3.

In particular, the material has a colorimetric index a*Rext of between −6 and 1, preferably between −4 and 0 and a colorimetric index b*Rext of between −6 and 1 and preferably between −5 and 0.

All the light characteristics presented in the description are obtained according to the principles and methods described in the European standard EN 410 relating to the determination of the light and solar characteristics of the glazings used in glass for the construction industry.

The light characteristics are measured using the illuminant D65 at 2° perpendicularly to the material mounted in a double glazing (unless otherwise indicated):

- LT corresponds to the light transmission in the visible region in %,
- $R_{ext}$ corresponds to the external light reflection in the visible in %, observer in outside area,
- the absorption is measured on the outside and corresponds to the formula:

$$A_{ext} = 1 - LT - R_{ext},$$

a*T and b*T correspond to the colors in transmission a* and b* in the L*a*b* system, a*$R_{ext}$ and b*$R_{ext}$ correspond to colors in reflection a* and b* in the L*a*b* system, the observer in outside area.

These glazings may be assembled on a building or a vehicle.

The invention therefore also relates to a glazing mounted on a vehicle or on a building.

A glazing for the building generally delimits two spaces, an "exterior" space and an "interior" space. It is considered that the sunlight entering a building goes from the outside to the inside.

In a double glazing configuration, the present invention makes it possible to obtain a very high selectivity S (in DGU) in particular greater than 2.0 or even greater than 2.2, a solar factor (SF) below 30%, or even less than 28%, neutral colors in transmission and in external reflection.

Unless specifically stipulated, the expressions "above" and "below" do not necessarily mean that two layers and/or coatings are positioned in contact with one another. When it is specified that a layer is deposited "in contact" with another layer or with a coating, this means that there cannot be one (or several) layer(s) inserted between these two layers (or layer and coating).

In the present description, unless otherwise indicated, the expression "based on", used to characterize a material or a layer with respect to what it contains, means that the mass fraction of the constituent that it comprises is at least 50%, in particular at least 70%, preferably at least 90%.

The functional coating may comprise one or several metallic functional layers, preferably based on silver, each arranged between two dielectric coatings. The functional coating may especially comprise one, two, three or four metallic functional layers. According to these embodiments:
  the functional coating comprises at least one silver-based functional metal layer, or
  the functional coating comprises at least two silver-based functional metal layers, or
  the functional coating comprises at least three silver-based functional metal layers.

The silver-based functional metallic layers comprise at least 95.0%, preferably at least 96.5% and better still at least 98.0% by weight of silver, relative to the weight of the functional layer. Preferably, a silver-based functional metallic layer comprises less than 1.0% by weight of metals other than silver, relative to the weight of the silver-based functional metallic layer.

The functional coating may be replaced by a functional layer able to act on solar radiation and/or infrared radiation. The term "functional layer" may be a lamination interlayer of PVB type including an absorber in the infrared range, such as an organic pigment or absorbent particles (ITO nanoparticle, sun protection film 3M™ Prestige)

The transparent substrates according to the invention are preferably made of a rigid inorganic material, such as made of glass, or are organic, based on polymers (or made of polymer).

The substrate is preferably a sheet of glass.

The substrate is preferably transparent, colorless (it is then a clear or extra-clear glass) or colored, for example blue, gray or bronze. The glass is preferably of soda-lime-silica type but it can also be a glass of borosilicate or alumino-borosilicate type and may also be an organic glass.

The substrate advantageously has at least one dimension greater than or equal to 1 m, even 2 m and even 3 m. The thickness of the substrate generally varies between 0.5 mm and 19 mm, preferably between 0.7 and 9 mm, especially between 2 and 8 mm, even between 4 and 6 mm. The substrate may be flat or curved, indeed even flexible.

The invention relates to a glazing comprising a material according to the invention. The glazing is preferably in monolithic, double, laminated and/or multiple form.

The details and advantageous features of the invention will become apparent from the following non-limiting examples with reference to the figures for which:
  FIG. 1 to FIG. 9 show the different configurations according to the invention.
  FIG. 10 to FIG. 13 show the transmission and absorption profiles of the materials according to the exemplary embodiments.
  FIG. 14 to FIG. 17 show the transmission and absorption profiles of the materials according to the comparative examples.

EXAMPLES

With reference to FIG. 1 to 9, various conceivable configurations can be seen.

FIG. 1 shows a single glazing coated with a layer. The absorbent element may consist of the substrate or the layer. This embodiment is particularly suitable for the case of flexible substrates.

The embodiments according to FIG. 2 to 5 include two substrates assembled using a lamination interlayer. These are laminated glazings. The absorbent element may either consist of one of the substrates (preferably the exterior substrate) (FIG. 2), or of a layer deposited on the glass or on the lamination interlayer.

FIG. 3 shows the configuration: glass/interlayer/functional layer/glass.

FIG. 4 shows the configuration: glass/absorbent layer/interlayer/functional layer/glass.

FIG. 5 shows the glass/absorbent layer/interlayer/functional layer/glass/low-emissivity layer configuration.

FIGS. 6 and 7 show a double glazing. In FIG. 6, a functional coating is deposited on face 2, on the glass substrate. In FIG. 7, a functional coating is deposited on an absorbent layer which itself was previously deposited on the exterior substrate (face 2).

FIGS. 8 and 9 show a double laminated glazing. FIG. 8 shows the configuration: glass/interlayer/glass/functional layer/cavity/glass. FIG. 9 shows the configuration: glass/absorbent layer/interlayer/glass/functional layer/cavity/glass.

EXAMPLES

Example 1

I. Functional Coating (RF1)
  A functional coating with two layers of Ag was deposited by means of a magnetic-field-assisted (magnetron) sputtering device on a substrate made of clear soda-lime glass with a thickness of 4 mm. It has a stack of:
    Glass/Di1/CF1/B1/Di2/CF2/B2/Di3, where:
    the functional metal layers (CF) are silver (Ag) layers;
    the blocking layers (B) are metal layers made of NiCr;
    the dielectric coatings (Di) comprise layers based on a mixed oxide of zinc and tin (SnZnOx), silicon nitride (Si3N4) layers, and zinc oxide (ZnO) layers.

II. Absorbent Element in Layer (A1)
  An absorbent layer is deposited by a liquid method on a second substrate made of clear soda-lime glass with a thickness of 4 mm in the following manner:

A liquid composition is prepared by mixing the following elements (dyes and matrix) in the following amounts:

| Component | Portion by weight |
| --- | --- |
| Sigma-Aldrich, 4-methyl-2-pentanone (MIBK), solvent | 69.7544 |
| PMMA MW120000, Sigma-Aldrich | 30.0000 |
| disodium osine, 2% aqueous solution | 0.044 |
| Epolin, Epolight 4037, powder | 0.048 |
| Epolin, Epolight 3801, powder | 0.142 |
| Epolin, Epolight 6084, powder | 0.0096 |
| Epolin, Epolight 5839, powder | 0.002 |

The composition is applied at ambient temperature on the glass substrate using an adjustable Baker-type film applicator (or bar coater) of the Elcometer brand. The bar height is adjusted to achieve a dry thickness of 50 µm. The layer is dried at ambient temperature overnight.

III. Configuration of the Glazing.

A multiple laminated glazing was assembled in a traditional manner, by means of an Eastman, Saflex RB41 (non-tinted PVB) film 0.76 mm thick so as to obtain the assembly as shown in FIG. 9.

It has, from the outside to the inside:

Substrate 1/absorbent layer/lamination interlayer/substrate 2/RF//cavity/substrate 3 wherein the interspace is 16 mm and is filled with 90% argon.

Example 2

I. Functional Coating (RF2)

A functional coating with three layers of Ag was deposited by means of a magnetic-field-assisted (magnetron) sputtering device on a substrate made of clear soda-lime glass with a thickness of 4 mm. It has a stack of:

Glass/Di1/CF1/B1/Di2/CF2/B2/Di3/CF3/B3/Di4 wherein the functional metal layers (CF) are silver (Ag) layers; the blocking layers (B) are metal layers made of NiCr; the dielectric coatings (Di) comprise layers based on a mixed oxide of zinc and tin (SnZnOx), silicon nitride layers (Si3N4), and zinc oxide (ZnO) layers.

A specific example of such a stack is described in example 7 of application WO 2019/015917.

II. Absorbent Element (A2)

The absorbent element consists of a tinted lamination interlayer using dyes such that it has, when it is laminated between two substrates made of clear glass, an absorption ($A_{ext}$) distributed among the areas:

alpha: 75
A: 31
B: 39
C: 27
D: 67

III. Configuration of the Glazing.

A multiple laminated glazing has been assembled in a traditional manner so as to obtain the assembly as shown in FIG. 8.

It has, from the outside to the inside:

Substrate 1/absorbent lamination interlayer/substrate 2/RF//cavity/substrate 3 wherein the interspace is 16 mm and is filled with 90% argon.

Example 3

I. Functional Layer (RF3)

A functional coating with a layer of Ag was deposited by means of a magnetic-field-assisted (magnetron) sputtering device on a substrate made of clear soda-lime glass with a thickness of 4 mm. It has a stack of:

Glass/Di1/CF1/B1/Di2, where:
the functional metal layer (CF) is a silver (Ag) layer;
the blocking layer (B) is a metal layer made of NiCr;
the dielectric coatings (Di) comprise layers based on a mixed oxide of zinc and tin (SnZnOx), silicon nitride (Si3N4) layers, and zinc oxide (ZnO) layers.

II. Absorbent and Functional Element (A3)

A tinted lamination interlayer made of "Saflex SG" PVB 0.38 mm thick is used.

This interlayer has both functional coating properties since it absorbs in the IR spectrum and is an absorbent element because it is absorbent in the visible range.

III. Additional Absorbent Element (A1)

An absorbent layer identical to that of example 1 is deposited by a liquid method on another substrate.

IV Configuration

A multiple laminated glazing has been assembled in a traditional manner so as to obtain the assembly as shown in FIG. 9. It has the following configuration: Glass/CA(A1)/PVB (A3)/glass/RF3/cavity/glass Example 4

I. Functional Coating (RF1)

A functional coating with two layers of Ag was deposited by means of a magnetic-field-assisted (magnetron) sputtering device on a substrate made of clear soda-lime glass with a thickness of 4 mm. It has a stack of:

Glass/Di1/CF1/B1/Di2/CF2/B2/Di3, where:
the functional metal layers (CF) are silver (Ag) layers;
the blocking layers (B) are metal layers made of NiCr;
the dielectric coatings (Di) comprise layers based on a mixed oxide of zinc and tin (SnZnOx), silicon nitride (Si3N4) layers, and zinc oxide (ZnO) layers.

II. Absorbent Elements

Two elements provide the absorption:
1. An absorbent layer is produced as follows (A4):
a liquid composition is prepared by mixing the following elements in the following amounts:

| Component | Portion by weight |
| --- | --- |
| Sigma-Aldrich, Tetrahydrofuran, solvent | 89.812 |
| Eastman, Saflex RB41 cut into pieces | 10.000 |
| Epolin, Epolight 4101, powder | 0.015 |
| Epolin, Epolight 3801, powder | 0.149 |
| Epolin, Epolight 6084, powder | 0.0238 |

The composition is applied at ambient temperature on the glass substrate using a film-pulling type apparatus of the Elcometer brand. The bar height is adjusted to achieve a dry thickness of 50 µm. The layer is dried at ambient temperature overnight.

2. A 0.38 mm tinted lamination interlayer made of PVB, of the "Vanceva Coral Rose (RB17 8078) type, is used (A5).

III. Configuration of the Glazing

A multiple glazing is produced, as shown in FIG. 9.

The substrate bearing the absorbent layer (A5) is laminated with the tinted lamination interlayer (A5) with the substrate bearing the functional layer (RF1), the absorbent layer arranged on face 2 and the functional layer arranged on face 4.

A double glazing is produced with a third glass substrate by providing a 16 mm cavity filled with 90% argon so as to form the structure:

Glass/absorbent layer (A5)/absorbent PVB (A6)/glass/RF1/cavity/glass

Example 5

I. Functional Coating (RF4)

A functional coating based on conductive oxide was deposited by means of a magnetic-field-assisted sputtering (magnetron) device on a substrate made of clear soda-lime glass 4 mm thick. It has a stack of:

Glass/$Si_3N_4$ 30 nm/$SiO_2$ 17 nm/ITO 72 nm/$Si_3N_4$ 9 nm/$SiO_2$ 50 nm.

II. Absorbent Elements (A3)

A tinted lamination interlayer made of "Saflex SG" PVB 0.38 mm thick is used.

This interlayer has both functional coating properties since it absorbs in the IR spectrum and is an absorbent element because it is absorbent in the visible range.

III. Additional Absorbent Element (A1)

An absorbent layer identical to that of example 1 is deposited by a liquid method on another substrate.

III. Configuration of the Glazing

A laminated glazing was assembled in a traditional manner. It has the following configuration: Glass/CA(A1)/PVB (A3)/glass/RF TCO.

The substrate bearing the absorbent layer (A1) is laminated with the tinted lamination interlayer (A3) with the substrate bearing the functional layer (RF4), the absorbent layer arranged on face 2 and the functional layer arranged on face 4.

Results

The average absorption ($A_{ext}$) between two wavelengths $\lambda$, of different configurations was calculated for each zone according to the formula:

$$A_{ext(Z)} = \left( \int_{\lambda_{minZ}}^{\lambda_{maxZ}} (1 - T(\lambda) - \sum_i R_{ext}(\lambda)) d\lambda \right) / (\lambda_{maxZ} - \lambda_{minZ})$$

For each zone Z defined between Z=[$\lambda_{min\ Z}$, $\lambda_{max\ Z}$] and summarized in the table below.

COUNTER-EXAMPLES

Counter-examples 1 and 2 include a functional coating but no absorbent layer.

Counter-Example C1

A multiple laminated glazing similar to example 1 but without the absorbent layer was produced as shown in FIG. 8.

It has, from the outside to the inside:

Substrate 1/clear lamination interlayer/substrate 2/RF1//cavity/substrate 3 wherein the interspace is 16 mm and is filled with 90% argon.

Counter Example C2

A multiple laminated glazing similar to example 2 was carried out but the absorbent PVB was replaced with a clear PVB. It has, from the outside toward the inside (FIG. 8):

Substrate 1/clear lamination interlayer/substrate 2/RF2//cavity/substrate 3 wherein the interspace is 16 mm and is filled with 90% argon.

Counter Example C3

A double glazing structure according to example Inv. 2 of the document WO 2020/079375 was carried out. It includes an absorbent colorimetric adjustment layer (CN2) on face 1, a two-layer functional Ag coating on face 2. The absorbent layer CN2 is a stack glass/$Si_3N_4$/$SiO_2$/$Si_3N_4$/SnZnN/$Si_3N_4$.

The structure has the configuration: Absorbent layer/Glass/RF/cavity/glass.

Counter-Example C4

A laminated structure according to document WO 2018/178547 was carried out. An Ag bilayer functional coating is deposited on one face of a glass substrate. A polymeric layer including an anthraquinone-type dye is deposited on one face of a second glass substrate. The following laminated structure is produced with an interlayer made of colorless PVB (FIG. 4):

Substrate 1/polymeric layer/clear PVB/RF 8/substrate 2.

The average absorption was calculated for each zone and summarized in Table 2 below.

TABLE 1

| Zones | Wavelength range (nm) | Average Absorption (%) Ex. 1 | Average Absorption (%) Ex. 2 | Average Absorption (%) Ex. 3 | Average Absorption (%) Ex. 4 |
|---|---|---|---|---|---|
| α | 300 to 379 | 95 | 89 | 95 | 95 |
| A | 380 to 479 | 60 | 47 | 63 | 59 |
| B | 480 to 549 | 47 | 49 | 48 | 45 |
| C | 550 to 629 | 40 | 40 | 44 | 42 |
| D | 630 to 779 | 86 | 79 | 87 | 83 |

TABLE 2

| Zones | Wavelength range (nm) | Average absorption (%) C1 | Average absorption (%) C2 | Average absorption (%) C3 | Average absorption (%) C4 |
|---|---|---|---|---|---|
| α | 300 to 379 | 94 | 95 | 67 | 93 |
| A | 380 to 479 | 26 | 26 | 29 | 52 |
| B | 480 to 549 | 15 | 16 | 25 | 24 |
| C | 550 to 629 | 19 | 20 | 29 | 33 |
| D | 630 to 779 | 32 | 31 | 39 | 52 |

The ratios of the various zones of the spectrum were calculated for the examples according to the invention and for the comparative examples in Table 3:

TABLE 3

|     | Ex. 1 | Ex. 2 | Ex. 3 | Ex. 4 | C1 | C2 | C3 | C4 |
|---|---|---|---|---|---|---|---|---|
| B/C | 1.17 | 1.24 | 1.09 | 1.08 | 0.78 | 0.82 | 0.72 | 0.88 |
| C | 2.17 | 1.99 | 1.98 | 2.00 | 1.71 | 1.53 | 1.55 | 1.33 |
| D/B | 1.84 | 1.60 | 1.82 | 1.85 | 2.18 | 1.86 | 2.15 | 1.51 |
| A/C | 1.52 | 1.18 | 1.44 | 1.41 | 1.36 | 1.31 | 1.56 | 1.01 |
| α/C | 2.40 | 2.24 | 2.17 | 2.30 | 5.00 | 4.74 | 2.78 | 2.33 |

IV. "Solar Control" and Colorimetry Performance

Table 4 below lists the main optical characteristics obtained:

TABLE 4

|     | Ex1 | Ex. 2 | Ex. 3 | Ex. 4 | C1 | C2 | C3 | C4 |
|---|---|---|---|---|---|---|---|---|
| TL (%) | 49.2 | 49.4 | 47.4 | 49.3 | 70.8 | 68.4 | 52 | 45.5 |
| a*T | −3.1 | −0.9 | −4.7 | −4.8 | −2.8 | −2.4 | −4.0 | −7.3 |
| b*T | 2.8 | 1.3 | 0.3 | 1.6 | 2.5 | 2.0 | −0.4 | 0.3 |
| Rext (%) | 8.3 | 9.1 | 7.2 | 8.3 | 0.0 | 13.4 | 18 | 21.8 |
| a*Rext | −0.3 | −1.9 | −1.0 | −0.9 | −4.2 | −4.7 | −0.1 | −6.4 |
| b*Rext | −3.2 | −5.4 | −1.8 | −4.1 | −8.7 | −6.5 | −2.3 | −1.3 |
| g (%) | 21.7 | 21.7 | 22.4 | 22.5 | 39.0 | 33.0 | 30 | 30.6 |
| selectivity | 2.3 | 2.3 | 2.1 | 2.2 | 1.8 | 2.1 | 1.7 | 1.5 |

Other configurations (double, triple, laminated, . . . ) can be carried out without departing from the scope of the present invention. In the case of a double configuration, any configuration may be appropriate, such as, for example, 4/16/4, 6/16/4. The thickness of the cavity can vary as well as its composition, which may also be 100% air.

In the case of a double glazing (DGU), the absorbent element may be arranged on face 1 or on face 2 and the functional coating preferably on face 2.

In the case of a laminate where the absorbent element is incorporated in the lamination interlayer, the functional coating may be deposited either on the face 2 of the first substrate or deposited on the interior face of the lamination interlayer.

The absorbent element may be introduced in the form of a soluble dye, pigment, metal nanoparticles, semi-conductor nanoparticles, etc. The absorbent element may be incorporated in a layer deposited by liquid or dry method.

The absorbent element may be introduced into the glass matrix of one of the substrates, preferably the substrate 1 turned outwardly.

The absorbent element may comprise several dyes which can be introduced into different elements of the glazing such as, for example, a pigment in one layer and another pigment in a lamination interlayer.

The functional coating could be based on 1 or 2 layers of Ag. The barrier layers may be made of NiCr instead of Ti.

The invention claimed is:

1. A material capable of equipping a building or passenger compartment by delimiting an exterior side and an interior side, comprising:
   at least one transparent substrate, each substrate comprising two main faces,
   a functional coating or a functional layer being able to act on solar radiation and/or infrared radiation,
   at least one absorbent layer element such that the material has, in the visible spectrum range, measured on the exterior side, when the spectrum is divided into 4 adjacent zones that are: zone A with a range from 380 to 479 nm, zone B with a range from 480 to 549 nm, zone C with a range from 550 to 629 nm, and zone D with a range from 630 to 779 nm:
   at least a first absorption range in zone D, and a second absorption range in zone B;
   a ratio of an average absorption $A_{ext}(B)$ integrated over the range of zone B to an average absorption $A_{ext}(C)$ integrated over the range of zone C is greater than 0.9;
   a ratio of an average absorption $A_{ext}(D)$ integrated over the range of zone D to the average absorption $A_{ext}(C)$ is greater than 1.5.

2. The material according to claim 1, wherein the ratio between the average absorption $A_{ext}(D)$ integrated over the range of zone D and the average absorption $A_{ext}(B)$ integrated over the range of zone B is greater than 1.2.

3. The material according to claim 2, wherein the ratio between the average absorption $A_{ext}(D)$ integrated over the range of zone D and the average absorption $A_{ext}(B)$ integrated over the range of zone B is greater than 1.5.

4. The material according to claim 1, wherein the ratio of an average absorption $A_{ext}(A)$ integrated over the range of zone A to the average absorption $A_{ext}(C)$ integrated over the range of zone C is greater than 1.2.

5. The material according to claim 4, wherein the ratio of the average absorption $A_{ext}(A)$ integrated over the range of zone A to the average absorption $A_{ext}(C)$ integrated over the range of zone C is greater than 1.4.

6. The material according to claim 1, wherein the material further has an absorption range in wavelengths between 300 and 379 nm defining an α zone, such that a ratio of an average absorption $A_{ext}(\alpha)$ integrated over the range in the α zone to the average absorption $A_{ext}(C)$ integrated over the range of zone C is greater than 1.5.

7. The material according to claim 6, wherein the ratio of the average absorption $A_{ext}(\alpha)$ integrated over the range in the zone to the average absorption $A_{ext}(C)$ integrated over the range of zone C is greater than 2.0.

8. The material according to claim 1, wherein the absorbent layer element includes at least two visible substances dispersed or dissolved in a matrix.

9. The material according to claim 1, comprising at least two transparent substrates and a lamination interlayer, wherein the absorbent layer element is a lamination interlayer including at least one absorbent substance in the visible.

10. The material according to claim 1, wherein at least one absorbent substance is incorporated in a layer deposited on one of the faces of the at least one substrate.

11. The material according to claim 1, wherein the functional coating or functional layer is a tinted lamination interlayer.

12. The material according to claim 1, wherein the functional coating or functional layer is a stack of thin layers deposited by magnetron.

13. The material according to claim 12, wherein the stack of thin layers comprises one or more metal functional layers, each deposited between two dielectric coatings.

14. The material according to claim 13, comprising at least two transparent substrates, wherein the stack of thin layers is arranged on an interior face of the outermost substrate corresponding to face 2 when the faces are numbered from the exterior toward the interior.

15. The material according to claim 1, wherein the substrate is made of glass or of polymer organic material.

16. The material according to claim 15, wherein the substrate is made of soda-lime-silica glass.

17. The material according to claim 1, wherein the material has a colorimetric index $a*T$ of between −6 and 1 and a $b*T$ colorimetric index of between −5 and 5.

18. The material according to claim 1, wherein the material has a colorimetric index $a*Rext$ of between −6 and 1 and a colorimetric index $b*Rext$ of between −6 and 1.

19. The material according to claim 1, wherein the ratio of the average absorption $A_{ext}(B)$ integrated over the range of zone B to the average absorption $A_{ext}(C)$ integrated over the of zone C is greater than 1.0, and the ratio of the average absorption $A_{ext}(D)$ integrated over the range of zone D to the average absorption $A_{ext}(C)$ is greater than 1.8.

20. A glazing comprising a material according to claim 1, wherein the glazing is in the form of a monolithic, double, laminated and/or multiple glazing.

* * * * *